(No Model.)
H. H. THORP.
JOURNAL BEARING.
No. 449,837. Patented Apr. 7, 1891.
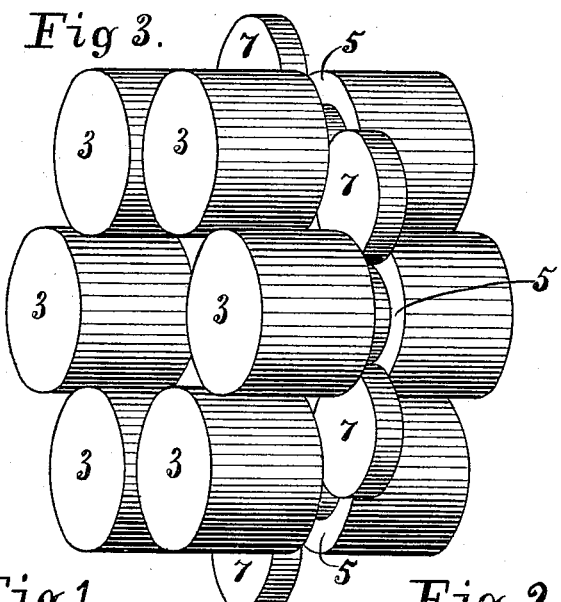
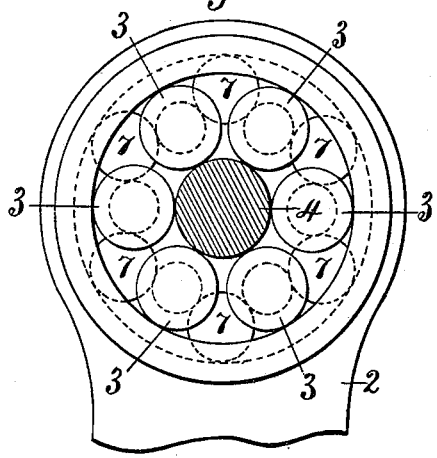
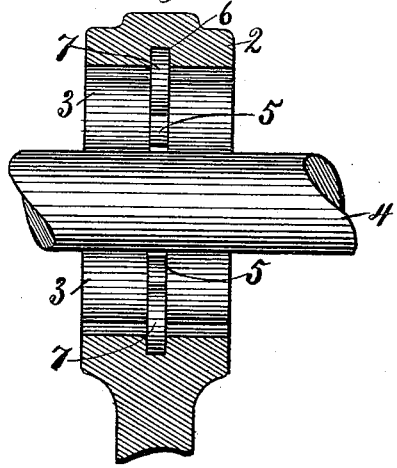
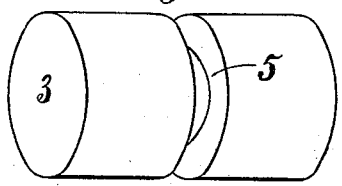
WITNESSES.
Frank Miller
Irene H. Corey
Henry H. Thorp, INVENTOR.
By H. T. Fisher,
atty.

UNITED STATES PATENT OFFICE.

HENRY H. THORP, OF CLEVELAND, OHIO.

JOURNAL-BEARING.

SPECIFICATION forming part of Letters Patent No. 449,837, dated April 7, 1891.

Application filed November 6, 1888. Serial No. 290,153. (No model.)

*To all whom it may concern:*

Be it known that I, HENRY H. THORP, a citizen of the United States, residing at Cleveland, in the county of Cuyahoga and State of Ohio, have invented certain new and useful Improvements in Anti-Friction Journal-Bearings; and I do hereby declare that the following is a full, clear, and exact description of the invention, which will enable others skilled in the art to which it appertains to make and use the same.

My invention relates to anti-friction journal-bearings; and it consists in the construction shown and described, and particularly pointed out in the claim.

In the accompanying drawings, Figure 1 is an end view of a bearing, showing the anti-friction rollers, sheaves, and shaft in working position. Fig. 2 is a vertical section thereof on the axis of the shaft. Fig. 3 shows a group of the rolls and the sheaves in the relation they bear to one another when in use, but detached from the bearing. Figs. 4 and 5, respectively, are details of the roll and the sheave used by me.

I am of course aware that anti-friction balls or rollers having suitable guides to keep them in position with respect to each other and to their bearing are not new in the art; but I am not aware that the particular construction and arrangement of parts constituting my invention have ever before been known or used.

Referring to the drawings, 2 denotes the journal-bearing proper, which may have the form shown here or any other practicable form, it being understood, of course, that my construction of anti-friction devices is not limited to use with any special bearing or for any special purpose, but may be employed wherever bearings of this nature can be profitably introduced, and extends all the way from printing-presses to car-axles and the like.

The anti-friction rolls 3 are shown as distributed entirely around the shaft or journal 4, and in such relation thereto and to the bearing 3 that with the shaft or journal they exactly fill the space within the bearing. Then in order that these rolls may be kept apart from each other to avoid contact between them, and that they may each perform their allotted function apart from the others, as well as remain in place and in proper alignment in the bearing, I provide each roller with an annular groove 5 about its center, say, about one-third the depth of the roller, and a corresponding groove 6 in the bearing. These opposite grooves form a track for disks 7, which are separate and independent factors in the combination, and occupy the middle space between the respective rollers, each sheave being in contact with two rollers and the bearing in the groove. Arranged in this way the disks serve to keep the rollers separated, so that it is impossible for them to touch one another, while at the same time, being free to rotate, they afford anti-friction means for maintaining the separation of the rollers and for keeping them in position in the bearing, as hereinbefore described. Thus it occurs that every part of the structure where friction ordinarily might occur is furnished with a moving anti-friction surface, and friction, as a consequence, is reduced below that attained in any other structure with which I am familiar.

It is obvious with the foregoing construction that the bearing requires no flange or other means at its end to prevent longitudinal movement of the rollers, as the sheaves turning in the two sets of grooves provide against such movement, and when the rollers and sheaves have been placed in position and the shaft inserted, all the parts must remain where placed and work as they are designed to until the shaft itself is withdrawn. By making the disks of about the relative size shown they serve, as stated, to furnish anti-friction bearings for the rollers as well as to keep the rollers exactly the right distance apart. The sheaves are designed to work freely at all points, so that they will not bind anywhere.

Having thus described my invention, what I claim as new, and desire to secure by Letters Patent, is—

The bearing having a continuous groove at about its center, a journal or axle, a series of rollers having circumferential grooves at about their center, and disks traveling in said grooves and each arranged to bear against two of the rollers, whereby the rollers are kept in alignment and apart and in position endwise forming an anti-friction bearing, substantially as described.

HENRY H. THORP.

Witnesses:
IRENE L. COREY,
H. T. FISHER.